Nov. 7, 1961 M. MAHARICK 3,007,423
BULKHEAD FOR VEHICLE BODIES
Filed April 1, 1959 2 Sheets-Sheet 1
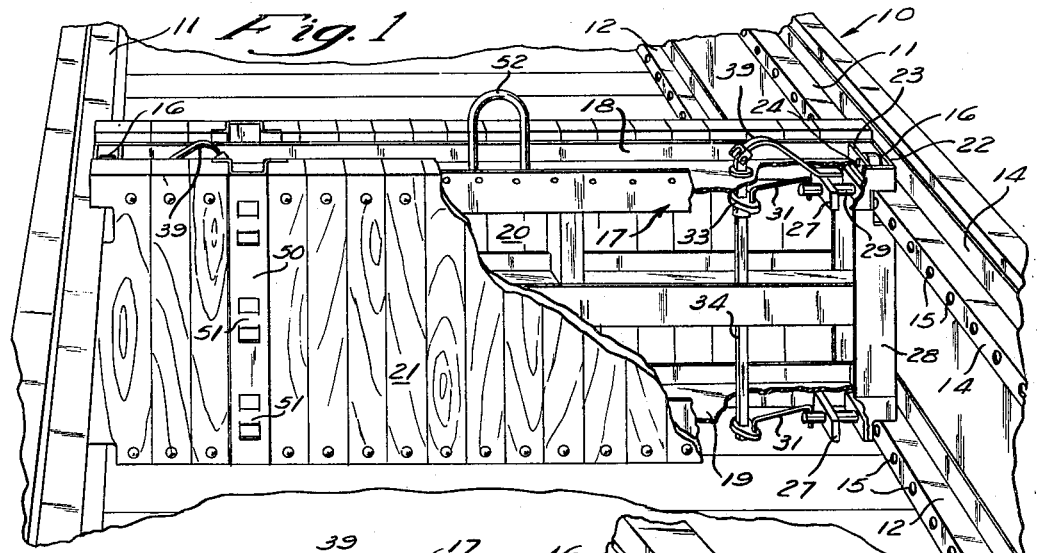
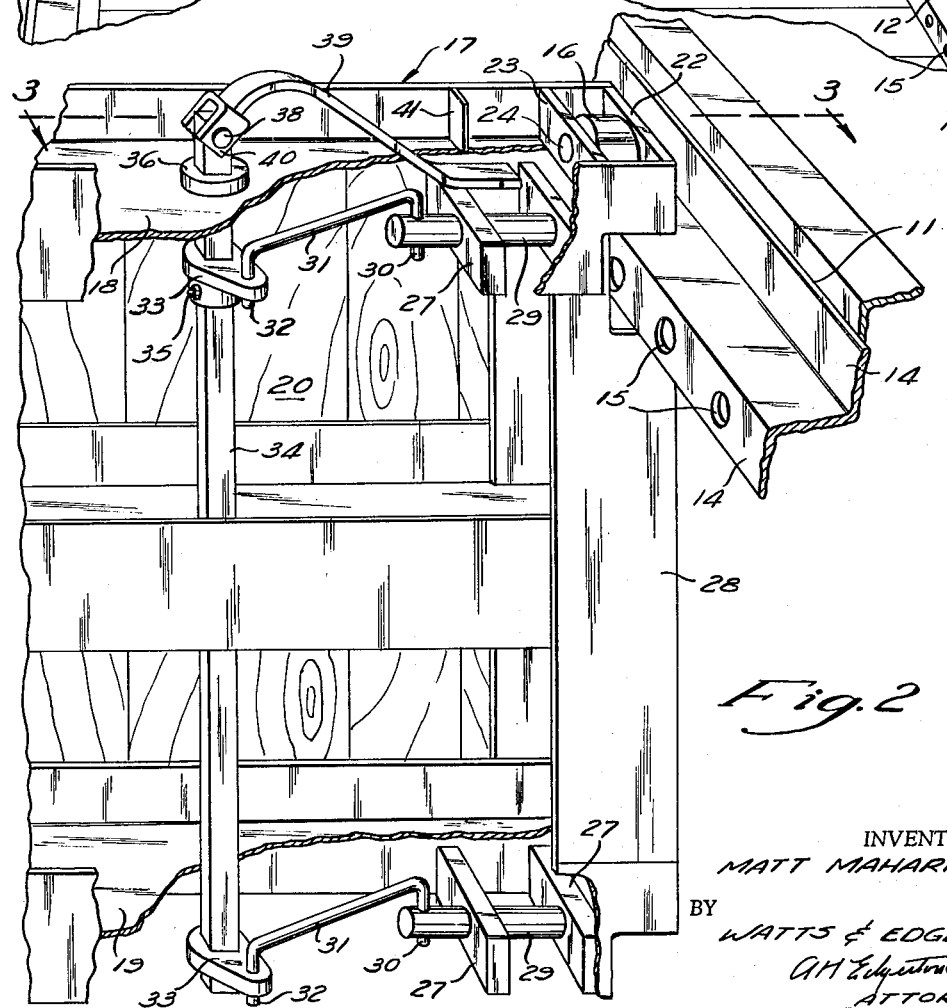
INVENTOR.
MATT MAHARICK
BY
WATTS & EDGERTON
ATTORNEYS

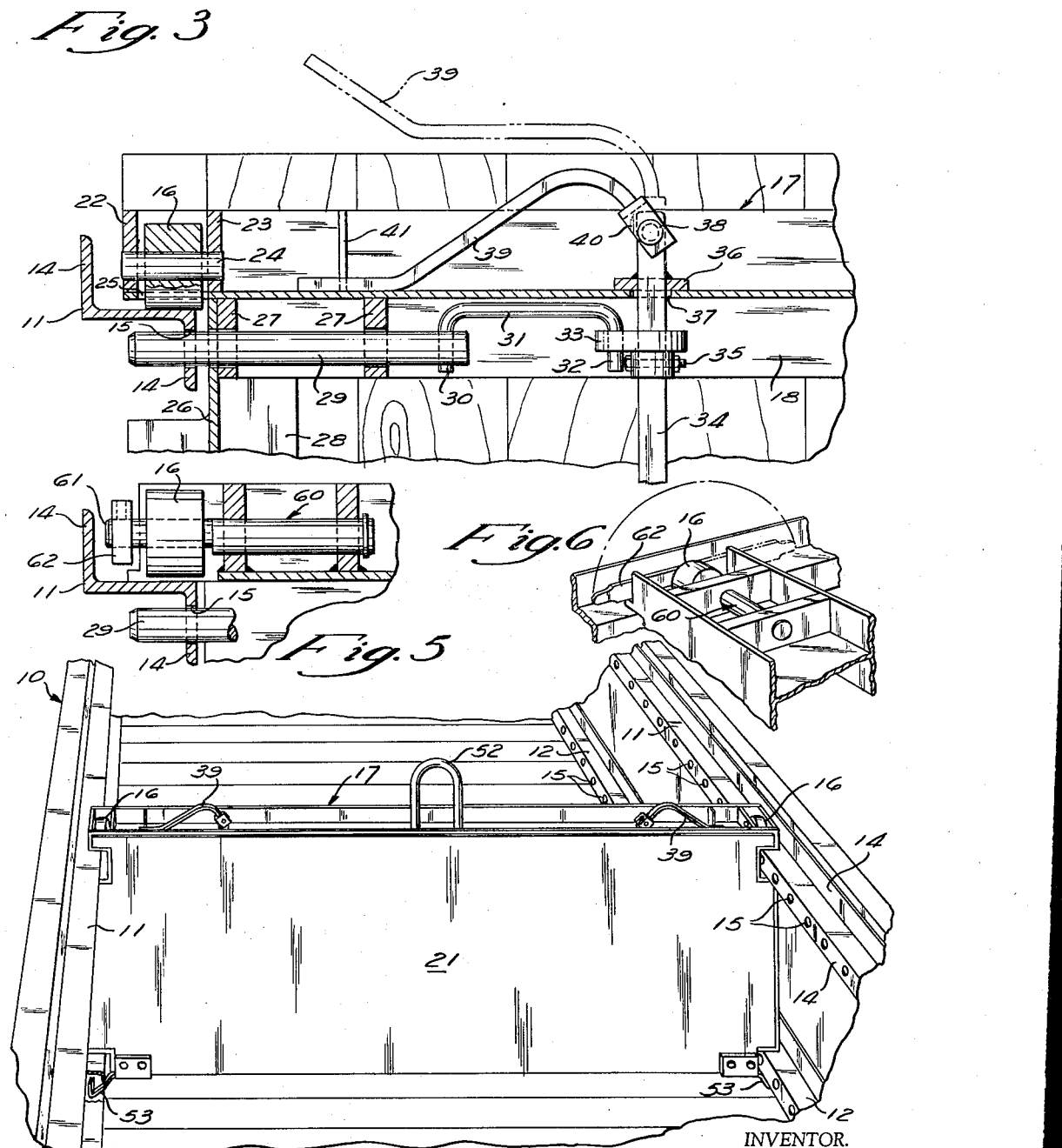

United States Patent Office 3,007,423
Patented Nov. 7, 1961

3,007,423
BULKHEAD FOR VEHICLE BODIES
Matt Maharick, Niles, Ohio, assignor to The Youngstown Steel Car Corp., Niles, Ohio, a corporation of Ohio
Filed Apr. 1, 1959, Ser. No. 803,463
6 Claims. (Cl. 105—376)

This invention relates broadly to adjustable cross partitions or bulkheads for freight cars and more specifically to improvements in bulkheads adapted for use in gondolas, box cars, truck bodies and in similar environs. The invention contemplates a bulkhead that may be readily adjusted and locked in place by throw bolts engaged in apertures in rails in the top and bottom of the car, and mechanism for locking the throw bolts in their adjusted position after actuation thereof.

Further objects of the invention embrace structural improvements and refinements which are economic of manufacture, efficient of operation and which are designed to afford the locked adjustment of the bulkhead with ease and dispatch.

Other objects and advantages more or less ancillary to the foregoing, and the manner in which all the various objects are realized, will appear in the following description, which considered in connection with the accompanying drawings, sets forth the preferred embodiment of the invention.

Referring to the drawings:

FIG. 1 is a view in perspective of a fragmentary portion of a railroad car illustrating the bulkhead therein.

FIG. 2 is an enlarged perspective view of the throw bolts and the actuating mechanism therefor.

FIG. 3 is a longitudinal sectional view, a fragmentary portion of the car.

FIG. 4 is a view of modified form similar to FIG. 1.

FIG. 5 is a sectional view of a fragmentary portion of a modified form of the roller and associated parts.

FIG. 6 is a view in perspective of a fragmentary portion of the roller and frame illustrated in FIG. 5.

Referring first to FIG. 1, the vehicular car 10 may be of any conventional form save for lineal rails or tracks 11 on the upper face of the side walls thereof and lineal rails 12 on lower end of the opposed side walls. The tracks are formed of structural steel, Z-bars having opposed flanges 14 on the top and bottom thereof, the lower depending flange on each Z-bar having a series of spaced openings 15 therein. The upper and lower flanges are arranged to present smooth continuous faces for the reception of rollers 16 in carriages 17 carried by the bulkhead. The bulkhead comprises top and bottom wide flange beams 18 and 19 transverse the car and a pair of spaced walls 20 and 21 attached to the outer faces thereof which may be either vertical planking (FIG. 1) or steel plates (FIG. 4). The carriages 17 are formed in the ends of the beams 18 and 19 and include cross plates 22 welded on the ends thereof and second spaced cross plates 23 welded between the flanges of the beams to provide vertical walls which are drilled for the support of axles 24 for the rollers 16. The rollers protrude through openings 25 in the webs of the beams and are engaged with the subjacent faces of the flanges of the Z-bars 11 and 12.

The side walls of the upper and lower portions of the bulkheads are formed with recesses 26 to provide a clearance between the Z-bars and side walls of the bulkheads. The webs of the beams 18 and 19 are formed with depending planks 27 defining secondary channels which are closed in the ends thereof by the webs of stanchion 28 welded thereon. The plates 27 and webs of the stanchion 28 are drilled for the reception of throw bolts 29 aligned with the openings 15 in the Z-bars 11 and 12, the holes in the plates 27 and the stanchion 28 are disposed in aligned relation with each other. The inner ends of the throw bolts are cross drilled to receive the depending ends 30 of drag links 31. A second depending arm 32 on the opposed end of the drag link is engaged in a drilled opening in a crank arm 33 affixed upon shafts 34 of square cross section and locked in place by bolts 35. The shafts are retained from downward movement by annular plates 36 welded to the shaft above the crank arms 33 and the opening 37 in the web of the beam 18 is large enough to accommodate rotation of the shaft. The upper portions of shafts 34 are cross drilled for pins 38 constituting fulcrums for a handle 39 having depending ears 40 thereon arranged in straddled relation with the upper ends of the shafts. The handles 39 are bent at right angles adjacent the inner ends thereof and the ears 40 are of adequate height to elevate the body of the handle, when lifted, above the top of the flanges of the beam 18, so the shafts 34 may be rotated. When the handles 39 are folded downwardly, rotative movement thereof is arrested by the contiguous flanges of the beam 18 and by vertical plates 41 welded in the channels adjacent the outer ends thereof. When the handles are rotated, the crank arms 33 and drag links 31 effect the insertion of the throw bolts 29 into the openings 15 in the Z-bars 11 and 12 or the withdrawal thereof. When the bolts are engaged in the opening 15, the handle is lowered between the flanges of the channel areas 18 and the edge of the plates 41, thus blocking rotative movement thereof.

As shown in FIG. 1, certain of the strips of the planking may be eliminated and flanged channel irons 50 substituted therefor. The channel irons are secured to the bulkhead cross beams 18 and 19 and are perforated to provide anchor pins 51 for tie straps to facilitate the anchorage of lading, such as boxes or crates, etc., within the car.

A U-bolt 52 may be provided, if desired, in the center of the top of the bulkhead to accommodate removal thereof and guide brackets 53 may be secured to the lower portion of the bulkhead to minimize lateral movement thereof.

As shown in FIG. 5, the rollers 16 are mounted, a shaft 60 having an eccentric journal 61 on the end thereof for the roller 16. A lever 62 is affixed to the journal 61 to facilitate the rotation thereof through an arc of 180°. In operation, the lever may be adjusted to lift the roller 16 from the Z-bar 11 and thus relieve the roller, the journal and the Z-bar from wearing flat areas thereon due to vibration of the parts.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

What is claimed is:

1. A bulkhead mounted for lineal adjustment in a freight car having top and bottom rails on the side walls of said car, said rails having spaced openings therein, said bulkhead comprising spaced front and back walls, vertical shafts between said walls and adjacent to the vertical edges of said bulkhead, each shaft having crank arms affixed thereon, drag links pivotally connected to said crank arms, and throw bolts disposed in horizontal alignment with said rails and pivotally connected to said drag links, a handle pivoted on the top of each of said shafts for rotating the shaft and simultaneously moving the throw bolts connected thereto into and out of said openings in the adjacent rails, said handle having an offset portion therein to restrain rotative movement thereof when the handle is lowered between the spaced walls of said bulkhead.

2. An adjustable bulkhead for a freight vehicle comprising a car having vertical side walls, lineal rails on the top and bottom of said side walls of said car, said rails having spaced openings therein, said bulkhead comprising spaced front and rear walls, vertical shafts adjacent the sides of said bulkhead and between the front and rear walls thereof, each of said shafts having crank arms thereon adjacent to the top and bottom thereof, throw bolts horizontally aligned with the adjacent rails and pivotally interlinked with said cranks and a handle pivotally connected to the upper portion of each of said shafts for rotating the shaft and simultaneously moving the throw bolts connected thereto into and out of the openings in the adjacent rails, said handle being curved and configured for engagement with the front and rear walls of the bulkhead when it is folded downwardly and adapted to facilitate rotation of said handle when it is elevated.

3. An adjustable bulkhead for a freight car having spaced front and rear walls, rails on the top and bottom of side walls of said car having spaced openings therein confronting the interior of the car, said bulkhead comprising front and rear walls, vertical shafts adjacent to the vertical edges of said bulkhead and between the front and rear walls thereof, throw bolts disposed in horizontal alignment with said rails, linkage connecting said throw bolts along each vertical edge with the adjacent shaft for reciprocative movement of said throw bolts, a handle pivoted on the upper ends of said shafts for rotating the shaft and simultaneously moving the throw bolts connected thereto into or out of said openings in the adjacent rails, said handle being movable out of the space between the walls of the bulkhead to accommodate rotative movement thereof when the handle is elevated, and to restrain rotation of the handle when it is folded downwardly between the walls of said bulkhead.

4. An adjustable bulkhead for a freight car having lineal rails on the top and bottom of the side walls of said car, said rails having openings in the confronting faces thereof said bulkhead comprising spaced front and rear walls, vertical shafts between said walls of the bulkhead and adjacent to the side edges thereof, crank arms affixed to each of said shafts adjacent the ends thereof, links pivoted to each of said crank arms, throw bolts disposed horizontally between said front and rear walls and adjacent to their vertical edges and pivotally connected to the crank arms of the adjacent shaft, hand levers hinged to the upper ends of said shafts for rotating the shaft and simultaneously moving the bolts attached thereto into or out of the openings in said rails, said hand levers being curved so the free ends thereof will lie between said spaced walls of said bulkhead when the handle is depressed and clear the upper ends of the bulkhead walls when the handle is elevated.

5. An adjustable bulkhead for a freight car provided with rails having openings in the opposed faces thereof disposed on the top and bottom of the side walls of a freight car, said bulkhead comprising front and rear walls having vertical edges near said rails, shafts carried in said bulkhead between said walls and adjacent the vertical edges thereof, throw bolts slidably mounted in the bulkhead along its vertical edges, means pivotally connecting each of said shafts to the adjacent throw bolts for reciprocating said bolts into and out of said openings in said rails and for locking said shafts against rotation when said bolts are in said openings, rollers supporting said bulkhead, said rollers being engageable with the top rails and cam means operatively connected to said rollers for lowering and raising said rollers into and out of engagement with the top rails.

6. An adjustable bulkhead for a railway car, said bulkhead comprising vertical spaced, front and rear walls having smooth outer surfaces, upper and lower, horizontal beams between and connected to said walls near their upper and lower edges, horizontal shafts carried by said upper beam near its ends, bulkhead supporting rollers mounted on said shafts, sets of throw bolts slidably carried by the upper and lower beams near their ends, vertical shafts disposed between said front and rear walls and rotatably carried by the upper and lower beams, means pivotally connecting each shaft with an adjacent set of throw bolts and means attached to each shaft for rotating it and reciprocating the throw bolts connected thereto and for locking the shaft against rotation.

References Cited in the file of this patent
UNITED STATES PATENTS

| | | |
|---|---|---|
| 1,049,655 | Boller et al. | Jan. 7, 1913 |
| 2,160,870 | Jones | June 6, 1939 |
| 2,220,436 | Ziegler | Nov. 5, 1940 |
| 2,565,657 | Haseltine | Aug. 28, 1951 |
| 2,911,925 | Adler et al. | Nov. 10, 1959 |